United States Patent Office 3,307,185
Patented Feb. 28, 1967

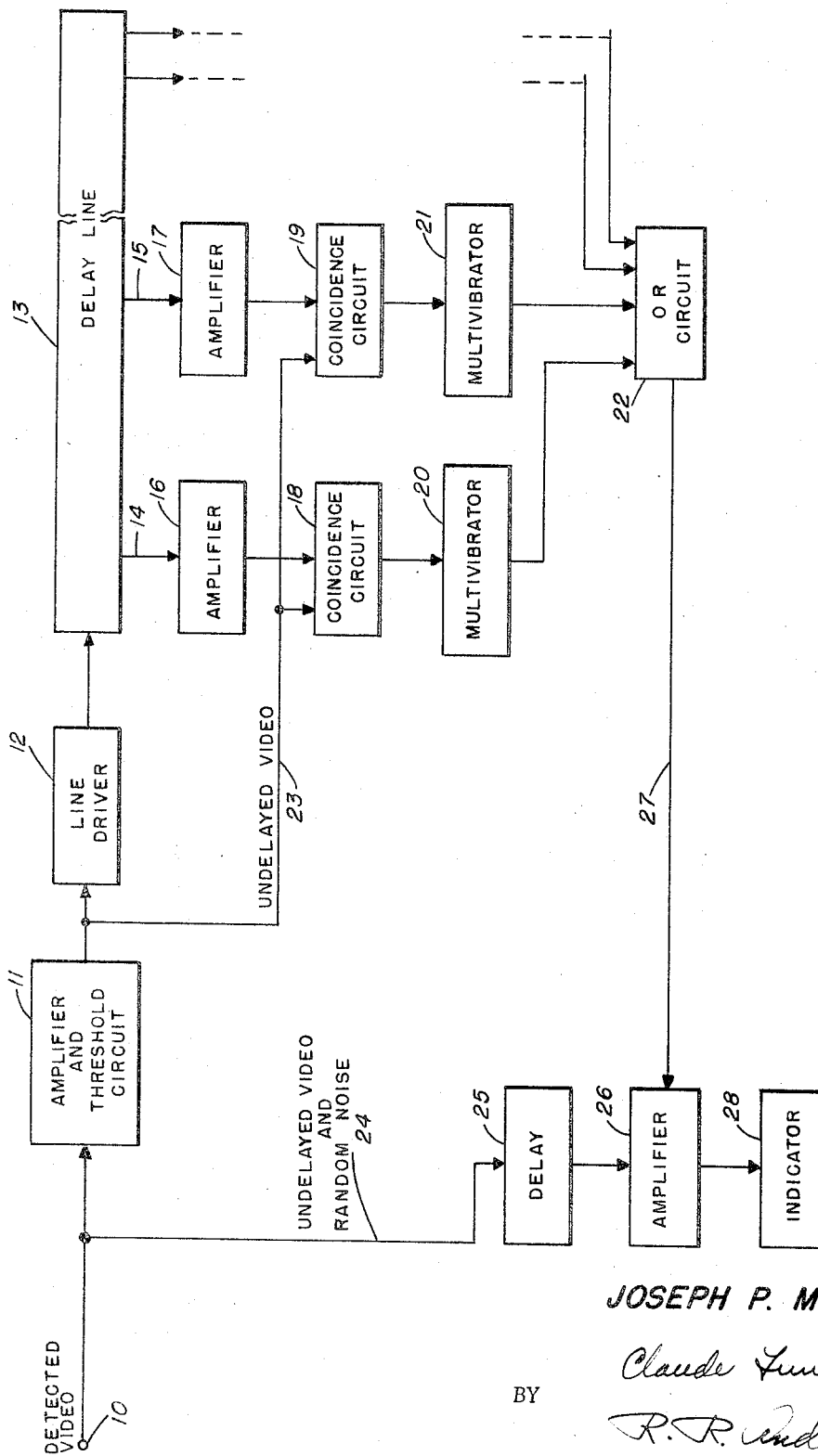

3,307,185
INTERFERENCE SUPPRESSOR
Joseph P. Mefford, Glen Cove, N.Y., assignor, by mesne assignments, to the United States of America as represented by the Secretary of the Navy
Filed Jan. 25, 1965, Ser. No. 427,996
7 Claims. (Cl. 343—17.1)

This invention relates to the elimination of pulse interference from a radar or other pulse receiver and more particularly to the elimination of pulse interference by recognition of the interfering pulse repetition frequency and the utilization of this information to blank the video amplifier of the radar system so that the objectionable interference does not appear in the radar scope display.

One of the problems commonly encountered with radar systems is that of distinguishing target return signals from interference signals. Radar interference falls generally into two broad categories: random interference and pulsed interference. The random interference, which may be due to receiver noise or atmospheric phenomena, has not easily ascertainable period of occurrence. The pulsed type of interference, frequently caused by friendly radars, and often at a known repetition rate, typically has a high repetition rate at or near the repetition rate of the radar system. Although the presence of either type of interference will degrade the operation of a radar system, the presence of pulsed interference of a high repetition rate is especially troublesome to a radar system designed to lock onto and track a particular target. In the case of a visual presentation, such as a PPI scan, the presence of interference can render the identification and selection of a desired target signal difficult or impossible.

It is highly unlikely that a radar would lock onto and track a pulsed interference signal rather than a true target signal unless by some small chance the pulsed repetition frequency of both the radar system and the pulsed source happened to be the same. However, the frequency of the pulsed interference would, almost without exception, be different from that of the protected radar employing the present invention. In such a case, the invention would offer the following advantages:

(1) The target display will be enhanced in all modes of operation due to reduction of unsynchronized background pulses.

(2) The time required to lock on a target is reduced due to enhancement of the displayed target and the reduction of erroneous information that enters the tracking circuitry.

(3) Track gate jitter and antenna jitter is reduced, during a tracking operation, because the amount of erroneous information entering the tracking circuitry is reduced.

In at least one known prior art device objectionable pulsed interference is reduced through the use of a gating pattern wherein only those pulses of any pulse repetition period will be passed which were also present and occupying substantially the same location in the preceding period. In this arrangement a comparison signal is obtained which is employed to gate on the subsequent circuits at appropriate times so that the unwanted interference does not appear in the final display.

The present invention offers an improvement over the prior art devices by first discerning if interfering pulses are present through recognition of their actual pulse repetition frequency and then by using this information to blank out the video amplifier of the protected radar. The video output of the radar receiver is otherwise unaltered.

The invention represents a simpler means for blanking the protected receiver than direct blanking by an offending friendly radar if the interfering radar does not already produce a suitable blanking trigger or if the distance between offending and offended radars is too great to make interconnecting cables practical. The instant invention blanks only when pulsed interference exists, while a blanking trigger from a neighboring friendly radar will blank continuously, although the interference may not exist continuously.

An added advantage of the invention is that it can be adjusted to protect against pulsed interference from a mobile radar (as on another ship) where interference was not previously encountered and where there was no previous knowledge of the interfering pulse repetition frequency. This is done by making adjustable taps on a delay line to facilitate manual hunting for the offending pulse repetition frequency. The device operates independently of the protected radar's pulse repetition frequency and the manner in which it is modulated, and furthermore the device does not introduce a voltage threshold situation in the output of the radar detector.

Accordingly, an object of the invention is to present an interference eliminator which effectively eliminates pulsed interference from the output of a radar.

Another object is the provision of an interference eliminator which acts to blank the video amplifier only when pulsed interference is received.

Another object is the provision of an interference eliminator which first determines if pulsed interference is present and then its repetition frequency.

Still another object of the invention is the provision of an interference eliminator which protects a radar against pulsed interference from a mobile radar where interference was not previously encountered and where there was no previous knowledge of the repetition frequency.

Yet another object is the provision of an interference eliminator which operates independently of the protected radar's pulse repetition frequency and the manner in which it is modulated.

Another object is the provision of an eliminator which does not introduce a voltage threshold situation in the output of the radar detector.

Other objects, advantages and novel features of the invention will become apparent from the following detailed description of the invention when considered in conjunction with the accompanying drawing wherein:

The drawing shows a block diagram of the invention.

Referring now to the lone figure making up the drawings there is shown an input terminal 10 which is used to receive detected video signals from the radar to be protected by the interference suppressor making up the invention. The signals applied to terminal 10 are, incidentally, taken directly from the radar's video detector and consist of both target signals and interference signals indiscriminately mixed. This signal is first applied to an amplifier and threshold circuit 11, of any well-known design. It may be noted at this point that all of the elements making up the invention are standard, well-known circuits which are familiar to anyone versed in the electronic art, so they will not be broken down into their basic components, but for the sake of simplicity will be indicated as blocks on the circuit diagram.

From the amplifier and threshold circuit 11 the signal is fed to a line driver 12, and from there to a magnetostrictive delay line 13 which may have a plurality of taps or outputs, but here for the sake of simplicity it has double outputs indicated as 14 and 15. The output 14 is connected to an amplifier 16 and then to a coincidence circuit 18, from which the signal goes to a monostable multivibrator 20, and on to an OR circuit 22.

The outputs from delay line 13 are fed to parallel circuits, depending upon the number of interfering pulsed repetition frequencies that are being accommodated, each parallel circuit handling a particular frequency. Therefore output 15 is fed to the parallel arm comprising an amplifier 17, coincidence circuit 19, and monostable multivibrator 21. The output from multivibrator 21 is connected to OR circuit 22 just as the output of multivibrator 20 is connected to OR circuit 22.

Connected to the output of amplifier and threshold circuit 11 is a line 23 which takes the undelayed video signals from amplifier 11 and feeds it as parallel inputs to each of the coincidence circuits. From this arrangement it is clear that coincidence circuits 18 and 19 will function on receipt of a delayed and undelayed signal, as will be fully described hereinafter. Another connection at terminal 10 is made by line 24 which feeds the detected video signal to a delay line 25 from where the signal is amplified by amplifier 26 and passed on to a display device 28 which may be a cathode ray tube, for example. Amplifier 26 also has another input in the form of lead 27 which supplies the output of OR circuit 22 to the input of amplifier 26.

Turning now to the operation of the device it will be seen that the circuits consisting of amplifier and threshold circuit 11, line driver 12, delay 13, amplifiers 16 or 17, and coincidence circuits 18 or 19 provide the means for determining interference pulses of a particular pulse repetition frequency depending on which of the parallel channels the unknown interference will pass through according to the period determined by the delay line taps. The threshold circuit 11 will stop broad band receiver noise of large amplitude from triggering the delay line 13. All distinct pulses which overcome the threshold 11 will be of a magnitude sufficient to drive line driver 12 which, in turn, drives the magnetostrictive delay line 13.

As has been pointed out previously, delay line 13 may have any number of output taps and therefore any number of predetermined delay periods to be used in discerning an interfering pulse repetition frequency, when such frequency is known, or the output line tap may be made adjustable to facilitate in manually hunting for the offending frequency. Each output tap from the delay line 13 will have a circuit associated with it such as amplifier 16, coincidence circuit 18 and monostable multivibrator 20, but for the sake of clarity only two such parallel circuits have been shown in the drawing.

Of all the pulses entering input terminal 10 and passing through amplifier threshold circuit 11, each parallel path and its associated coincident circuit will pass only one particular interfering pulsed repetition frequency; namely the frequency which has the same repetition period as that determined by the corresponding tap on delay line 13. Therefore, each coincidence circuit "discerns" a particular pulsed repetition frequency. The interfering pulsed repetition frequencies are assumed to be known so it merely remains to place the tap on the delay line at the correct delay when the device is constructed. Unexpected interfering pulsed repetition frequencies can be taken care of by means of a variable tap. Even in the case of unexpected interfering pulsed repetition frequencies (such as encountered from mobile radars) it is not necessary to known or to determine the repetition frequency, it is necessary, merely, to adjust the tap until the unsynchronized background pulses disappear.

Each tap on delay line 13 corresponds to a delay of one interpulse period of a particular interfering pulse repetition frequency. The outputs of the delay line are amplified by amplifiers 16 and 17 and the amplified pulses gate coincidence circuits 18 and 19. If an undelayed pulse, as supplied along line 23 from the radar video detector to coincidence circuits 18 and 19, is coincident to the delayed pulse at one of the coincidence circuits, the resulting pulse is identified as an interfering pulse. This is true because it identifies the interfering pulse train in question as having a known period equal to the delay of the delay line at the corresponding top. Monostable multivibrators 20 and 21 shape the interfering pulses to make then suitable for blanking.

Blanking pulses from all of the branches are consolidated by OR circuit 22 and are then used to blank linear amplifier 26 which supplies signals to indicator 28. Linear amplifier 26 has the capability of being blanked and, thereby, allows blanking pulses from the OR circuit 22 to block the corresponding interference pulses. The amplifier has a gain of one so it does not otherwise affect the signal sent on to indicator 28.

Delay line 25 delays the output of the radar detector to compensate for delays in coincidence circuits 18 and 19, the OR circuit 22, monostable multivibrators 20 and 21, and the time lag between the time the blanking pulse occurs at amplifier 26 and the time that the amplifier is actually blanked. The delay of delay line 13 will be chosen to cause the blanking action to lead the interference pulses slightly and the pulse width of the pulses out of the monostable multivibrators 20 and 21 will cause the end of the blanking action to lag the interference pulse slightly. Thus, due to the blanking action overlapping this interference pulse, the device will be able to perform satisfactorily in the event of small variations in the interference pulse repetition frequencies or small drifts in the delay of delay line 13. If necessary, the time base of the display can be recovered by putting a delay line identical to line 25 in the path of the display synchronizer pulse.

From the above description of the structure and operation of the invention, it is obvious that the device offers material improvement over prior interference eliminators due to its capability of distinguishing between target video and interference pulses by correlating the individual interference pulse trains simultaneously. Furthermore, there is offered the novelty of using the received interference pulses as blanking pulse generators to blank themselves out of the radar display. These improvements are in addition to the fact that the described device will first determine if pulsed interference is even present, and then its repetition frequency, plus the fact that the video amplifier is blanked only when pulsed interference is received.

Obviously many modifications and variations of the present invention are possible in the light of the above teachings. It is, therefore, to be understood that within the scope of the appended claims the invention may be practiced otherwise than as specifically described.

What is claimed is:

1. An interference eliminator comprising
    means for receiving detected video signals from a radar system to be protected;
    means for delaying a portion of the signal;
    means to compare the delayed and the undelayed portions of the signal to produce a blanking pulse; and
    means to apply the blanking pulse to the video circuit of the radar.

2. An interference eliminator comprising
    means for receiving detected video signals;
    means for delaying the video signals;
    means for applying the delayed signals to a coincidence circuit;
    means for applying undelayed signals to the coincidence circuit;
    means utilizing the output of the coincidence circuit to form a blanking pulse;
    a video amplifier associated with a display device; and
    means to apply the blanking pulse to the video amplifier.

3. An interference eliminator for radar systems comprising
    means for receiving detected video signals from the radar;
    threshold means for passing only pulses of a particular amplitude;

a delay line for delaying the pulses passed by the threshold means;

a coincidence circuit for receiving the delayed pulses;

means for applying undelayed the detected video signals to the coincidence circuit;

a multivibrator to receive the output of the coincidence circuit and form a blanking pulse therefrom;

an amplifier and display means for displaying the video signals; and means for applying the blanking pulse to the amplifier whereby any pulsed interference appearing in the video signal is eliminated from the display means.

4. An interference eliminator for radar systems comprising means for receiving both target signals and pulsed interference signals from the radar;

threshold means for passing only pulses of a particular amplitude;

a first delay line for delaying the pulses passed by the threshold means;

a plurality of outputs from said delay line, each output corresponding to the delay of one interpulse period of a particular interfering pulse repetition frequency;

a plurality of coincidence circuits, one connected to each output of the delay line;

undelayed target and pulsed interference signals also applied to each coincidence circuit;

a plurality of multivibrators, one connected to the output of each coincidence circuit, each multivibrator forming a blanking pulse from the output of its associated coincidence circuit;

an OR circuit connected to receive the output of all the multivibrators and to consolidate the outputs into one blanking pulse;

video indicating means for displaying the detected video from the radar; and means to apply the consolidated blanking pulse to the display means whereby the pulsed interference is eliminated from the display means.

5. The interference eliminator of claim 4 wherein the indicating means comprises an amplifier to receive both target signals and pulse interference signals from the radar; and a cathode ray tube connected to the output of the amplifier to display the target signals remaining after the pulsed interference has been blanked out.

6. The interference eliminator of claim 5 further comprising a second delay line positioned between the means for receiving the detected signals from the radar and the amplifier associated with the display means.

7. The interference eliminator of claim 6 wherein the first and second delay lines are magnetostrictive.

No references cited.

CHESTER L. JUSTUS, *Primary Examiner.*

RODNEY D. BENNETT, *Examiner.*